US012587484B2

(12) United States Patent
Varga et al.

(10) Patent No.: US 12,587,484 B2
(45) Date of Patent: Mar. 24, 2026

(54) PACKET ORDERING FUNCTION FOR TSN/DetNet NETWORKS

(71) Applicant: Telefonaktiebolaget LM Ericsson (publ), Stockholm (SE)

(72) Inventors: Balázs Varga, Budapest (HU); György Miklós, Pilisborosjenö (HU); János Farkas, Kecskemét (HU)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 279 days.

(21) Appl. No.: 18/268,136

(22) PCT Filed: Dec. 3, 2021

(86) PCT No.: PCT/SE2021/051201
§ 371 (c)(1),
(2) Date: Jun. 16, 2023

(87) PCT Pub. No.: WO2022/139656
PCT Pub. Date: Jun. 30, 2022

(65) Prior Publication Data
US 2024/0297850 A1 Sep. 5, 2024

Related U.S. Application Data

(60) Provisional application No. 63/129,169, filed on Dec. 22, 2020.

(51) Int. Cl.
*H04L 47/34* (2022.01)
*H04L 47/283* (2022.01)

(52) U.S. Cl.
CPC ............ *H04L 47/34* (2013.01); *H04L 47/283* (2013.01)

(58) Field of Classification Search
CPC .............................. H04L 47/34; H04L 47/283
See application file for complete search history.

(56) References Cited

U.S. PATENT DOCUMENTS

2003/0125056 A1* 7/2003 Jiang ........................ H04L 1/187
                                                           455/466
2003/0128705 A1* 7/2003 Yi .......................... H04W 28/14
                                                           370/394
(Continued)

FOREIGN PATENT DOCUMENTS

WO WO-2008007170 A1 * 1/2008 ........... H04L 1/1887
WO WO-2009070576 A2 * 6/2009 ............ H04W 36/08
(Continued)

OTHER PUBLICATIONS

Morton et al. RFC4737: Packet reordering metrics. Nov. 2006; Retrieved from: https://tools.ietf.org/html/rfc4737 (Year: 2006).*
(Continued)

*Primary Examiner* — David R Lazaro
*Assistant Examiner* — Robert A Shaw
(74) *Attorney, Agent, or Firm* — COATS & BENNETT, PLLC

(57) ABSTRACT

A PDU ordering function (POF) restores the proper order of PDUs in a stream, at the Layer-2 or 3 level of a TSN or DetNet. The sequence number of the last PDU forwarded is stored, and compared to the sequence number of a newly received PDU. If the new PDU is an earlier or the "next" PDU in the stream, it is forwarded and the value of the last PDU forwarded is updated. If the newly received PDU is two or more sequence numbers ahead of the last PDU forwarded, it is buffered. Other PDUs are received and processed, and the value of the last PDU forwarded is updated. When the buffered PDU is the next one to the last PDU forwarded, it is retrieved from the buffer and forwarded. To bound the total latency the POF can impose on
(Continued)

aPDU stream, a predetermined maximum buffering time timer is started upon buffering the PDU. If the timer expires before the buffered PDU becomes "next" to the last PDU forwarded, it is nevertheless retrieved and forwarded.

20 Claims, 7 Drawing Sheets

(56) References Cited

U.S. PATENT DOCUMENTS

| | | | | |
|---|---|---|---|---|
| 2005/0100048 A1 * | 5/2005 | Chun | | H04L 1/1812 |
| | | | | 370/468 |
| 2008/0225765 A1 * | 9/2008 | Marinier | | H04B 7/155 |
| | | | | 370/310 |
| 2009/0046626 A1 * | 2/2009 | Shao | | H04L 47/10 |
| | | | | 370/320 |
| 2009/0310534 A1 * | 12/2009 | Lindskog | | H04L 1/1887 |
| | | | | 370/328 |
| 2011/0058497 A1 * | 3/2011 | Lindskog | | H04L 47/34 |
| | | | | 370/252 |
| 2011/0317546 A1 * | 12/2011 | Zhang | | H04L 1/1841 |
| | | | | 370/216 |
| 2012/0294281 A1 * | 11/2012 | Park | | H04L 1/1848 |
| | | | | 370/328 |
| 2016/0315736 A1 * | 10/2016 | Dwarakanath | | H04W 24/04 |
| 2018/0098241 A1 * | 4/2018 | Callard | | H04L 47/34 |
| 2019/0053099 A1 * | 2/2019 | Kim | | H04W 28/0278 |
| 2020/0336903 A1 | 10/2020 | Kim et al. | | |
| 2020/0351983 A1 * | 11/2020 | Wittberg | | H04L 47/34 |
| 2021/0274375 A1 * | 9/2021 | Li | | H04W 28/10 |
| 2024/0187140 A1 * | 6/2024 | Di Girolamo | | H04L 1/188 |

FOREIGN PATENT DOCUMENTS

| | | | | | |
|---|---|---|---|---|---|
| WO | WO-2009119004 A1 * | 10/2009 | | | H04L 69/32 |
| WO | WO-2015065914 A1 * | 5/2015 | | | H04L 1/1685 |
| WO | WO-2018199822 A1 * | 11/2018 | | | H04L 47/34 |

OTHER PUBLICATIONS

Balázs Varga, János Farkas, TSN—FRER improvements (Seamless Reset), IEEE 802.1 TSN TG, Mar. 2020 retrieved from: https://www.ieee802.org/1/files/public/docs2020/new-varga-FRER-seamless-reset-0320-v02.pdf (Year: 2020).*

Thomas et al, Worst-case Delay Bounds in Time-Sensitive Networks with Packet Replication and Elimination, Oct. 12, 2021 retrieved from: https://arxiv.org/abs/2110.05808v1 (Year: 2021).*

Mohammadpour, E. et al., "On Packet Reordering in Time-Sensitive Networks", work submitted for IEEE publication, ARXIV.org., Cornell University Library, Oct. 8, 2020, pp. 1-25, arXiv:2008.03075v4 [cs.NI].

IEEE Standards Association, "IEEE Standard for Local and metropolitan area networks—Frame Replication and Elimination for Reliability", IEEE Std 802.1CB™—2017, Approved Sep. 28, 2017, pp. 1-102, IEEE.

Finn, N. et al., "Deterministic Networking Architecture", Internet Engineering Task Force (IETF), Standards Track, RFC 8655, Oct. 2019, pp. 1-38, IETF.

* cited by examiner

100

STORE A SEQUENCE NUMBER OF THE LAST PDU FORWARDED — 102

RECEIVE A FIRST PDU — 104

COMPARE THE SEQ. NUMBER OF THE FIRST PDU TO THE SEQ. NUMBER OF THE LAST PDU FORWARDED — 106

≥ 2 AHEAD

STORE FIRST PDU — 112

START TIMER — 114

FIRST PDU IS NEXT OR TIMER EXPIRED? — 116

EARLIER OR NEXT

Y     N

UPDATE SEQUENCE NUMBER OF THE LAST PDU FORWARDED — 108

FORWARD THE FIRST PDU — 110

PACKET ORDERING FUNCTION FOR TSN/DetNet NETWORKS

This application claims priority to U.S. Provisional Patent Application Ser. No. 63/129,169, filed Dec. 22, 2020, titled "Packet Ordering Function for TSN/DetNet Networks," the disclosure of which is incorporated herein by reference in its entirety.

TECHNICAL FIELD

The present invention relates generally to data networks, and in particular to a Packet Ordering Function for Time Sensitive Networks and Deterministic Networks.

BACKGROUND

With the growth of the Internet, digital wireless communication networks, streaming of music, movies, and other content to consumers, migration of traditional computing and data storage to the so-called "cloud," and the like, data communication networks have grown dramatically in importance and capability. Real-time applications, such as autonomously controlled vehicles, demand deterministic networks. As used herein, a "deterministic" network is one having characteristics such as extremely low data loss rates, low packet delay variation (also known as jitter), and bounded latency. Two specific examples of efforts to develop deterministic networks are the Time-Sensitive Networking (TSN) Task Group (TG) of the Institute of Electrical and Electronics Engineers (IEEE) for Ethernet networks, and the Deterministic Network (DetNet) by the Internet Engineering Task Force (IETF) for Internet Protocol (IP) and Multiprotocol Label Switching (MPLS) networks.

The TSN TG within IEEE 802.1 Working Group (WG) deals with deterministic services through IEEE 802 networks. The TSN TG specifies the tools of the TSN toolbox, as well as the use of the tools for a particular purpose. TSN can be viewed as an evolution of Ethernet to guarantee low end-to-end latency, low jitter and low packet loss. TSN TG is chartered to provide deterministic services through IEEE 802 networks with (1) Guaranteed packet transport, (2) Low packet loss, (3) Bounded low latency and (4) Low packet delay variation (jitter).

To achieve extreme low packet loss, TSN TG specified Frame Replication and Elimination for Reliability (FRER) (802.1CB). FRER is targeted to avoid frame loss due to equipment failure. It is practically a per-frame 1+1 (or 1+n) redundancy function. There is no failure detection or switchover incorporated. FIG. 1 depicts the process. FRER duplicates data frames at an ingress, or Replication node, and sends the frames on two (or more) maximally disjoint network paths. The paths will naturally have different latencies. The duplicated frames are then collected at an egress, or Elimination node, where duplicate frames are deleted.

In IETF the Deterministic Networking (DetNet) WG focuses on deterministic data paths that can provide bounds on latency, loss, and packet delay variation (jitter), and high reliability. The WG addresses Layer 3 methods in support of applications requiring deterministic networking. DetNet focuses on aspects which are required to enable a multi-hop path, and forwarding along the path, with the deterministic properties of controlled latency, low packet loss, low packet delay variation, and high reliability. Layer 3 data plane technologies that can be used in DetNet networks include IP and MPLS.

The DetNet WG has also defined a packet replication function (PRF) and packet elimination function (PEF) for achieving extremely low packet loss. These are similar to functions defined for TSN, in order to simplify implementation and to allow use of the same concept in both Layer-2 (TSN) and Layer-3 (DetNet) networks.

One problem with the use of per-packet replication and elimination functions is out-of-order delivery of frames/packets, due to the differing latencies of the different paths over which the duplications are forwarded. This issue has been identified by both the IEEE and IETF WGs. Correcting frame/packet order is a difficult task. Accordingly, details of a Packet Ordering Function (POF) are not specified either by IETF or by IEEE, but it is left for further study. IETF DetNet WG has broadly defined a Packet Replication, Elimination, and Ordering Function (PREOF). However, only the expected result of the POF function is specified (i.e., that packets are reordered), but without any technical/implementation details. IEEE 802.1 TSN TG has not yet defined such a functionality.

According to the current state of the art, out-of-order packet delivery is handled at higher Open Systems Interconnection (OSI) network layers, such as at the end-point or host. For example, in a Transfer Control Program (TCP) stack when packets are sent to the application layer. Current networks do not address out-of-order packet delivery at the OSI Layer-2 or Layer-3 levels.

In this disclosure, the IEEE 802.1CB terminology and variable names are adopted, for example, "VariableName." New variables, functions and parameters follow the IEEE 802.1CB naming convention and are denoted in italic, for example, "NewEntityName." The term Protocol Data Unit (PDU) is used herein to refer to a frame, packet, or other quantum of data. A series of related PDUs is referred to as a "stream;" these are also known in the networking arts as a flow. In general, PDUs in a stream each have a sequence number, such as in a header, to facilitate proper ordering of the PDUs.

The Background section of this document is provided to place embodiments of the present invention in technological and operational context, to assist those of skill in the art in understanding their scope and utility. Approaches described in the Background section could be pursued, but are not necessarily approaches that have been previously conceived or pursued. Unless explicitly identified as such, no statement herein is admitted to be prior art merely by its inclusion in the Background section.

SUMMARY

The following presents a simplified summary of the disclosure in order to provide a basic understanding to those of skill in the art. This summary is not an extensive overview of the disclosure and is not intended to identify key/critical elements of embodiments of the invention or to delineate the scope of the invention. The sole purpose of this summary is to present some concepts disclosed herein in a simplified form as a prelude to the more detailed description that is presented later.

According to one or more embodiments described and claimed herein, a PDU ordering function (POF) restores the proper order of PDUs in a stream, at the Layer-2 or Layer 3 level of a TSN or DetNet. The sequence number of the last PDU forwarded is stored. The sequence number of a newly received PDU is compared to it. If the new PDU is an earlier or the "next" PDU in the stream, it is forwarded and the value of the last PDU forwarded is updated. This comparison and decision imposes virtually no delay on the PDU, and hence it has minimal impact on overall latency. If the newly received PDU is not earlier or next—that is, if it is two or more sequence numbers ahead of the last PDU forwarded, it is buffered. Other PDUs are received and processed, and the stored value of the last PDU forwarded is updated as they are forwarded. When the buffered PDU is the next one to the last PDU forwarded, it is retrieved from the buffer and forwarded (and the value of last PDU forwarded is updated). To bound the total delay the POF can impose on a PDU stream, in one embodiment a predetermined maximum buffering time timer is started upon buffering the PDU. If the timer expires before the buffered PDU becomes "next" to the last PDU forwarded, it is nevertheless retrieved and forwarded. The maximum buffering time cannot be smaller than the latency difference of the network paths used by the PDU stream.

This embodiment works well so long as the remaining delay budget of a PDU stream at the POF point is larger than the maximum buffering time. In another embodiment, where this may not be the case, for each PDU to be buffered (due to it being ahead of "next" to the last PDU forwarded), the POF first identifies the network path the PDU took. A path-dependent maximum buffering time is then selected based on the network path. The path-dependent maximum buffering times are engineered to fulfill the delay budget requirement.

Upon a POF reset, the buffer is flushed. Following a POF reset, the sequence number of the last PDU forwarded is initialized to that of the first PDU received, which is immediately forwarded. A POF reset may be triggered by no PDU being received by the POF for a predetermined duration.

One embodiment relates to a method of receiving Protocol Data Units (PDU) in a network stream of PDUs and forwarding the PDUs in a predetermined order, wherein each PDU includes a sequence number. A sequence number of the last PDU forwarded is stored. A first PDU is received. The sequence number of the first PDU is compared to the sequence number of the last PDU forwarded. In response to the sequence number of the first PDU being two or more greater than the sequence number of the last PDU forwarded, the first PDU is stored until the earlier of a predetermined buffering time expires and the sequence number of the first PDU being equal to one greater than the sequence number of the last PDU forwarded. In response to the sequence number of the first PDU being less than or equal to one greater than the sequence number of the last PDU forwarded, the first PDU is forwarded; and the sequence number of the last PDU forwarded is updated to be the sequence number of the first PDU.

Another embodiment relates to a network node implementing a Protocol Data Unit (PDU) Ordering Function (POF) operative to receive PDUs in a network stream of PDUs and forward the PDUs in a predetermined order, wherein each PDU includes a sequence number, the network node. The network node includes communication circuitry configured to receive PDUs from, and transmit PDUs to, other network nodes and processing circuitry operatively connected to the communication circuitry. The processing circuitry is configured to store a sequence number of a last PDU forwarded; receive a first PDU; and compare the sequence number of the first PDU to the sequence number of the last PDU forwarded. In response to the sequence number of the first PDU being two or more greater than the sequence number of the last PDU forwarded, the processing circuitry is configured to store the first PDU until the earlier of a predetermined maximum storage time expires and the sequence number of the first PDU being equal to one greater than the sequence number of the last PDU forwarded. In response to the sequence number of the first PDU being less than or equal to one greater than the sequence number of the last PDU forwarded, the processing circuitry is configured to forward the first PDU; and update the sequence number of the last PDU forwarded to be the sequence number of the first PDU.

BRIEF DESCRIPTION OF THE DRAWINGS

The present invention will now be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

DETAILED DESCRIPTION

For simplicity and illustrative purposes, the present invention is described by referring mainly to an exemplary embodiment thereof. In the following description, numerous specific details are set forth in order to provide a thorough understanding of the present invention. However, it will be readily apparent to one of ordinary skill in the art that the present invention may be practiced without limitation to these specific details. In this description, well known methods and structures have not been described in detail so as not to unnecessarily obscure the present invention.

Figure 1:
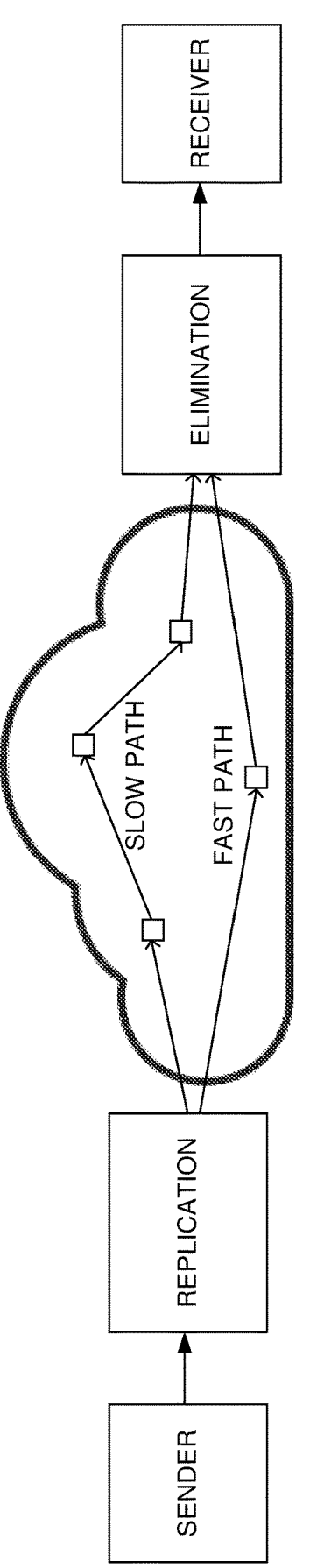
FIG. 1 is a block diagram of a TSN or DetNet network implementing PDU replication, forwarding by different network paths, and elimination.
Figure 2:
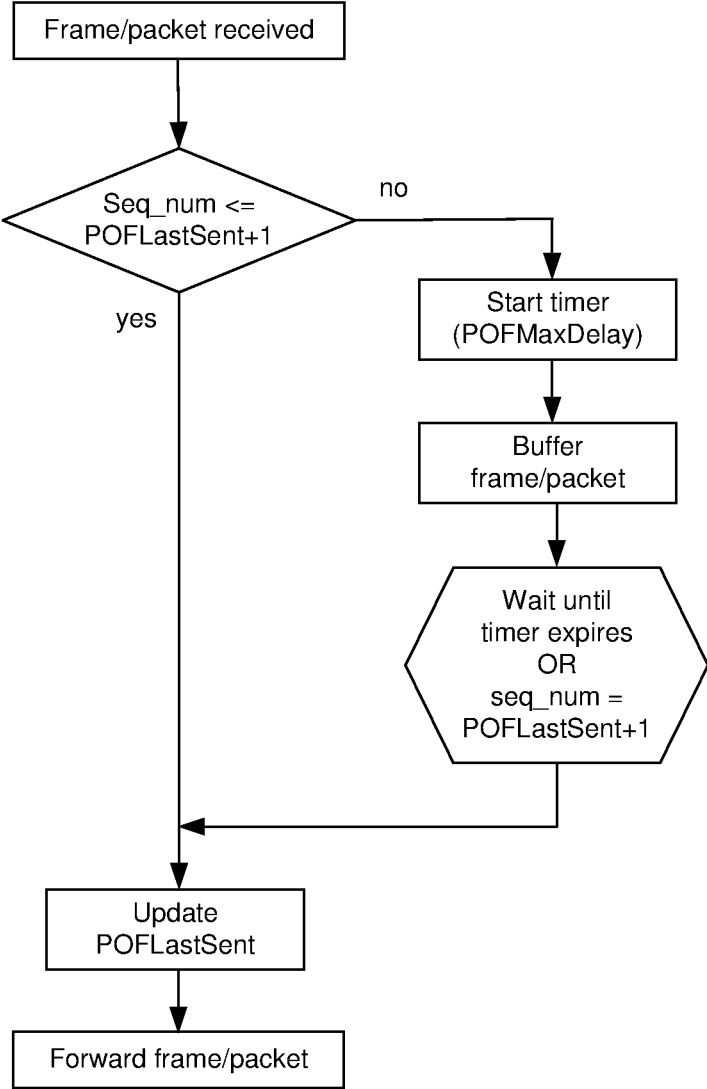
FIG. 2 is a flow diagram of a method of PDU ordering in a TSN or DetNet network according to one embodiment.

FIG. 2 presents a flowchart depicting the steps of a PDU Ordering Function (POF). The POF is downstream of a packet elimination operation. As such, the POF may be implemented in a network node downstream of the elimination node. Alternatively, the POF may be implemented in the same node as the elimination function, but operate on the output of the elimination function. Operation of the POF is described as it is ongoing; initialization considerations are described later.

Initially, a PDU is received by the POF. A sequence number (seq_num) of the newly received PDU is compared to a stored value of the last PDU forwarded by the POF (POFLastSent). If the newly received PDU is an earlier or the "next" PDU in the stream—that is, if $seq\_num \leq POFLastSent+1$—then the "yes" path of the flowchart is followed. The value of POFLastSent is updated (POFLastSent=seq_num), and the newly received PDU is forwarded. However, if the newly received PDU is further ahead in the PDU stream than being "next" to the last PDU forwarded—that is, if seq_num>POFLastSent+1—then the "no" path of the flowchart is followed. A timer is started, having a value of a predetermined maximum buffering time (POFMaxDelay), and the newly received PDU is buffered.

Other received PDUs are processed, and the value of POFLastSent is updated as they are forwarded. When seq_num=POFLastSent+1, the buffered PDU is the "next" PDU, and is retrieved from the buffer and forwarded. Alternatively, if the POFMaxDelay timer expires, the packet is also retrieved from the buffer, regardless of its seq_num. In either case, the value of POFLastSent is updated (POFLastSent=seq_num), and the PDU retrieved from the buffer is forwarded.

Note that the sequence number comparison operation seq_num≥ POFLastSent+1 is not necessarily mathematical, but may account for discontinuities due to a circular sequence number space. In some embodiments, the difference of sequence numbers in consecutive PDUs in a stream is bounded due to the History window of the Elimination function upstream of the POF.

Figure 3:
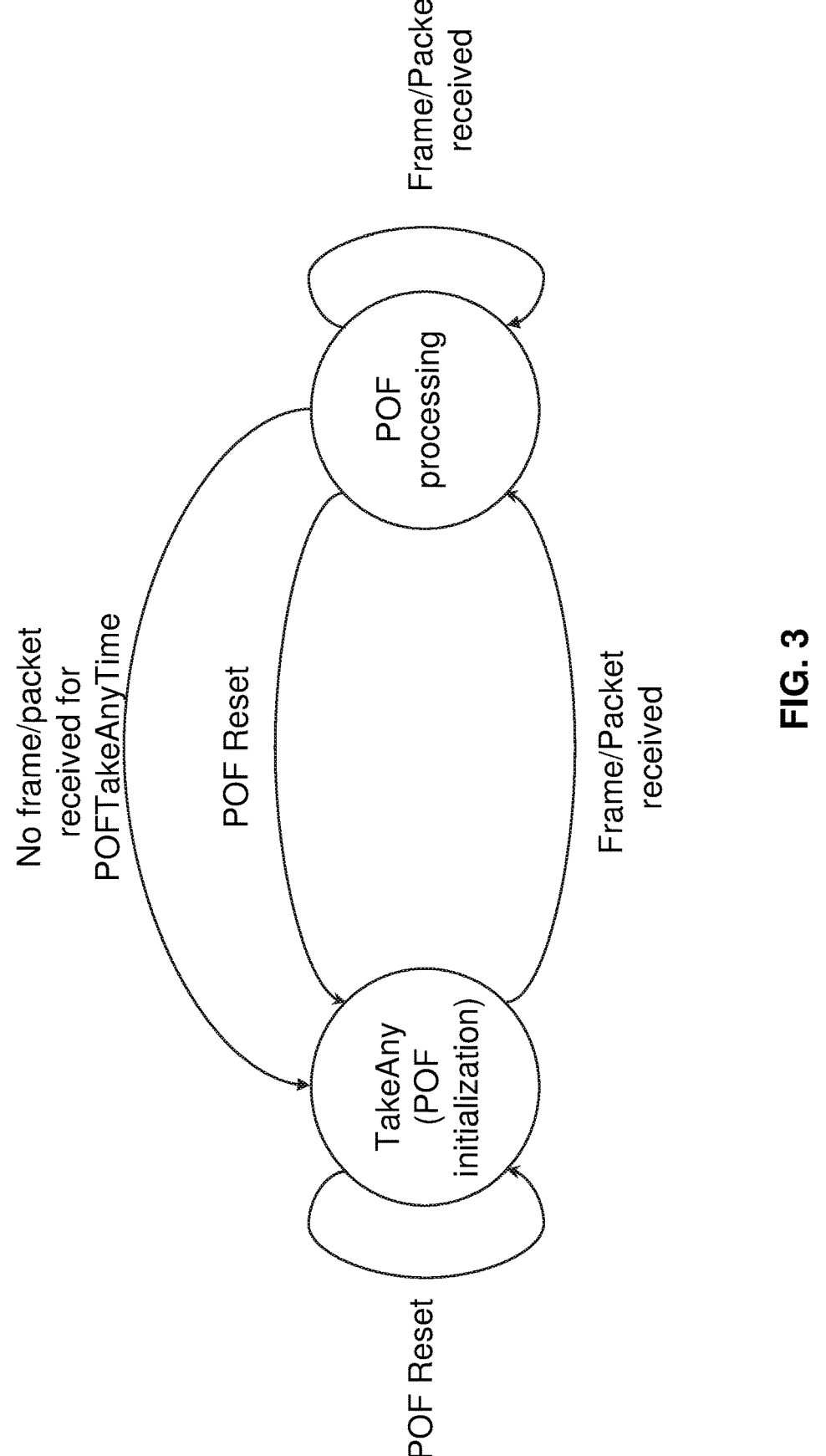
FIG. 3 is a state diagram showing the reset and initialization of a PDU ordering function.

The flowchart of FIG. 2, and the above description of operation of the POF, assume the POF is ongoing, in which case the value of POFLastSent is the sequence number of the last PDU forwarded in a PDU stream. This value must be initialized. FIG. 3 is a state diagram depicting a POF initialization state (TakeAny) and a POF processing state. In the POF initialization state, the value of POFLastSent is set to the sequence number of the first PDU received, and that PDU is immediately forwarded. The receipt of a PDU (and initialization of POFLastSent) triggers a transition to the POF processing state, where updating of POFLastSent occurs as described above and with reference to FIG. 2.

The POF transitions from the POF processing state to the POF initialization state upon a POF reset (e.g., triggered by a hardware signal, or by a higher layer function or application). An asserted POF reset signal or command will maintain the POF in the POF initialization state, regardless of the receipt of PDUs. In the POF initialization state, all buffers are flushed and the value of POFLastSent is cleared. In one embodiment, the POF will additionally transition from the POF processing state to the POF initialization state if no PDU for a PDU stream is received for a predetermined duration (POFTakeAnyTime). The value of POFTakeAny-Time may be calculated based on several factors, for example the RECOVERY_TIMEOUT related settings of the Elimination function(s) upstream of the POF, the PDU stream characteristics (e.g., inter PDU time), and the latency difference of the paths used by the PDU stream.

Note that multiple network failures may impact the POF function (e.g., complete outage of all redundant paths).

The POF described above, with reference to FIG. 2, does not appreciably delay PDUs received in sequence number order, and increases the latency of PDUs received out-of-order by a maximum duration of POFMaxDelay. This POF is effective for all network scenarios where the remaining delay budget of a PDU stream at the POF point is larger than POFMaxDelay.

Figure 4:
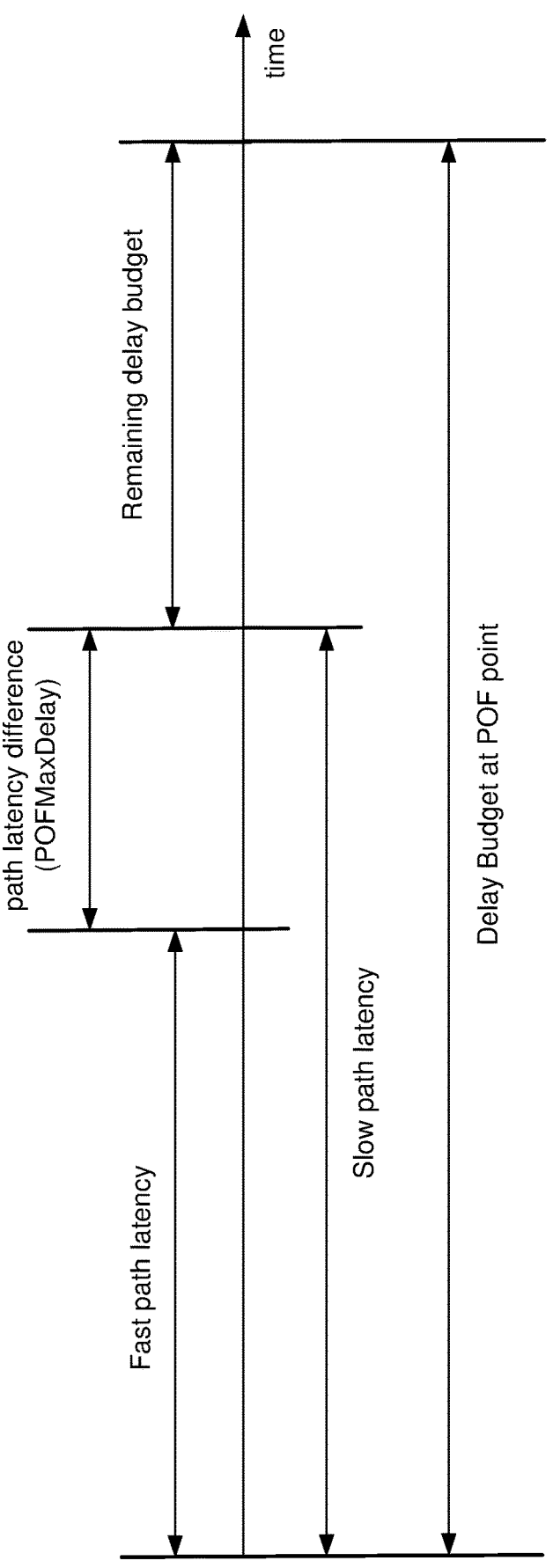
FIG. 4 is a timing diagram demonstrating the relationship of latencies and delay budgets.

FIG. 4 is a timing diagram depicting the latencies of a fast and a slow network path. The difference in these path latencies is the lower bound on POFMaxDelay. The timing diagram of FIG. 4 also shows the remaining delay budget for the PDU stream, and the overall delay budget at the POF point. In a network scenario where the remaining delay budget of a PDU stream at the POF point is smaller than POFMaxDelay, the POF described above cannot be guaranteed to work. The issue is that PDUs on the greatest latency path cannot be buffered in order to maintain delay budget of the PDU stream. It must be noted that such a PDU (i.e., forwarded over the network path having the greatest latency) needs no buffering as it is the "last chance" to deliver a PDU with a given sequence number. This is because all replicas must already have arrived via the network path(s) having shorter latencies.

Figure 5:
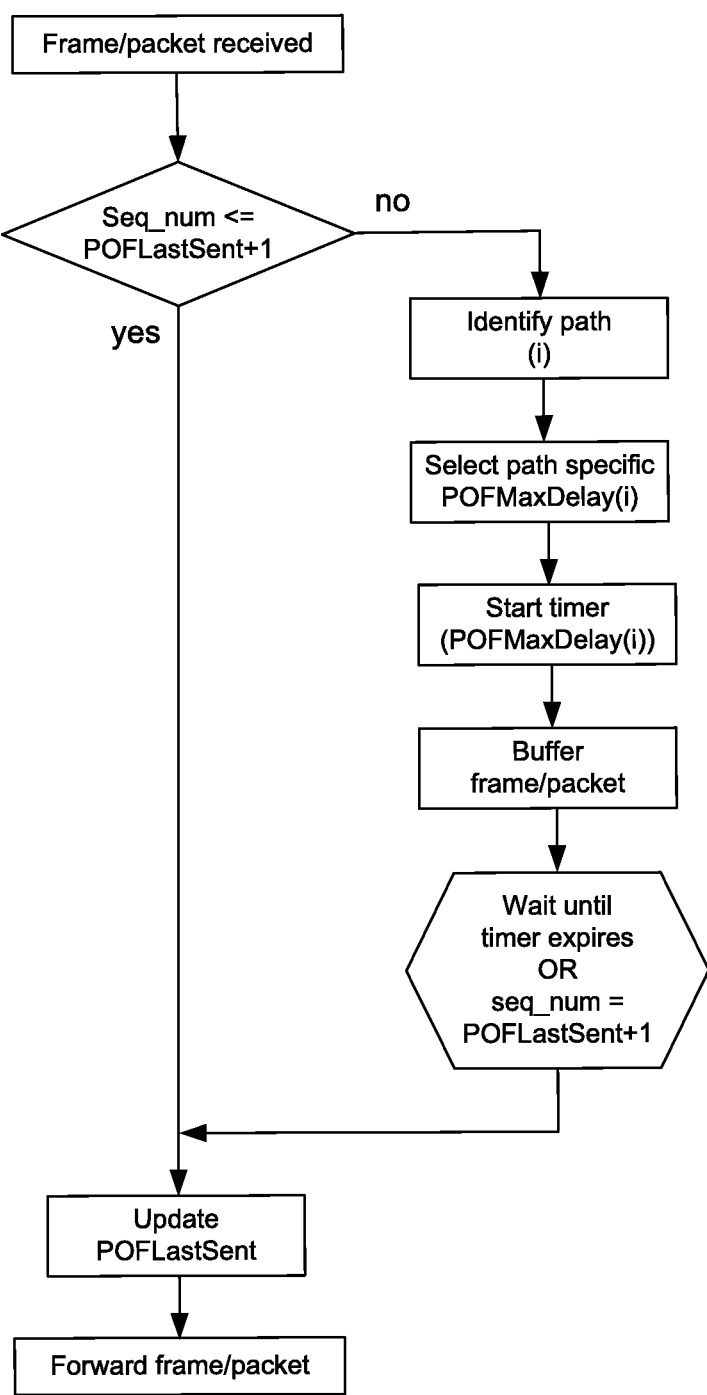
FIG. 5 is a flow diagram of a method of PDU ordering in a TSN or DetNet network according to another embodiment.

Accordingly, in one embodiment the POF algorithm of FIG. 2 is extended, as depicted in FIG. 5, to use path-dependent maximum buffering times. As described above (in the POF processing state), initially, a PDU is received by the POF. A sequence number (seq_num) of the newly received PDU is compared to the stored value of the last PDU forwarded by the POF (POFLastSent). If the newly received PDU is an earlier or the "next" PDU in the stream—that is, if seq_num≤ POFLastSent+1—then the "yes" path of the flowchart is followed. The value of POFLastSent is updated (POFLastSent=seq_num), and the newly received PDU is forwarded.

However, if the newly received PDU is further ahead in the PDU stream than being "next" to the last PDU forwarded—that is, if seq_num>POFLastSent+1—then the "no" path of the flowchart is followed. In this embodiment, the network path/taken by the newly received PDU is identified. A path-dependent maximum buffering time POF-MaxDelay(i) is selected, based on the network path. The path-dependent maximum buffering times POF-MaxDelay(0 . . . n) are engineered to fulfil the delay budget requirements, and may for example be stored in an array indexed by a network path identifier. As described above, a timer is started, having a value of a predetermined, path-dependent maximum buffering time POFMaxDelay(i), and the newly received PDU is buffered.

Other received PDUs are processed, and the value of POFLastSent is updated as they are forwarded. When seq_num=POFLastSent+1, the buffered PDU is the "next" PDU, and is retrieved from the buffer and forwarded. Alternatively, if the POFMaxDelay(i) timer expires, the packet is also retrieved from the buffer, regardless of its seq_num. In either case, the value of POFLastSent is updated (POFLastSent=seq_num), and the PDU retrieved from the buffer is forwarded.

Identification of the network path taken by a newly received PDU can be accomplished in numerous ways. For example, the POF may use ingress interface information from the PRF node. In one embodiment, the Replication function may set a PDU stream ID, which can be used as a PathID, and encode the ID in the PDU.

In this embodiment, where the maximum buffering time is network path-dependent, it may be particularly advantageous to implement the POF in the same node as the PEF, as this can simplify the ascertaining the network path taken by PDUs at the POF.

Figure 6:
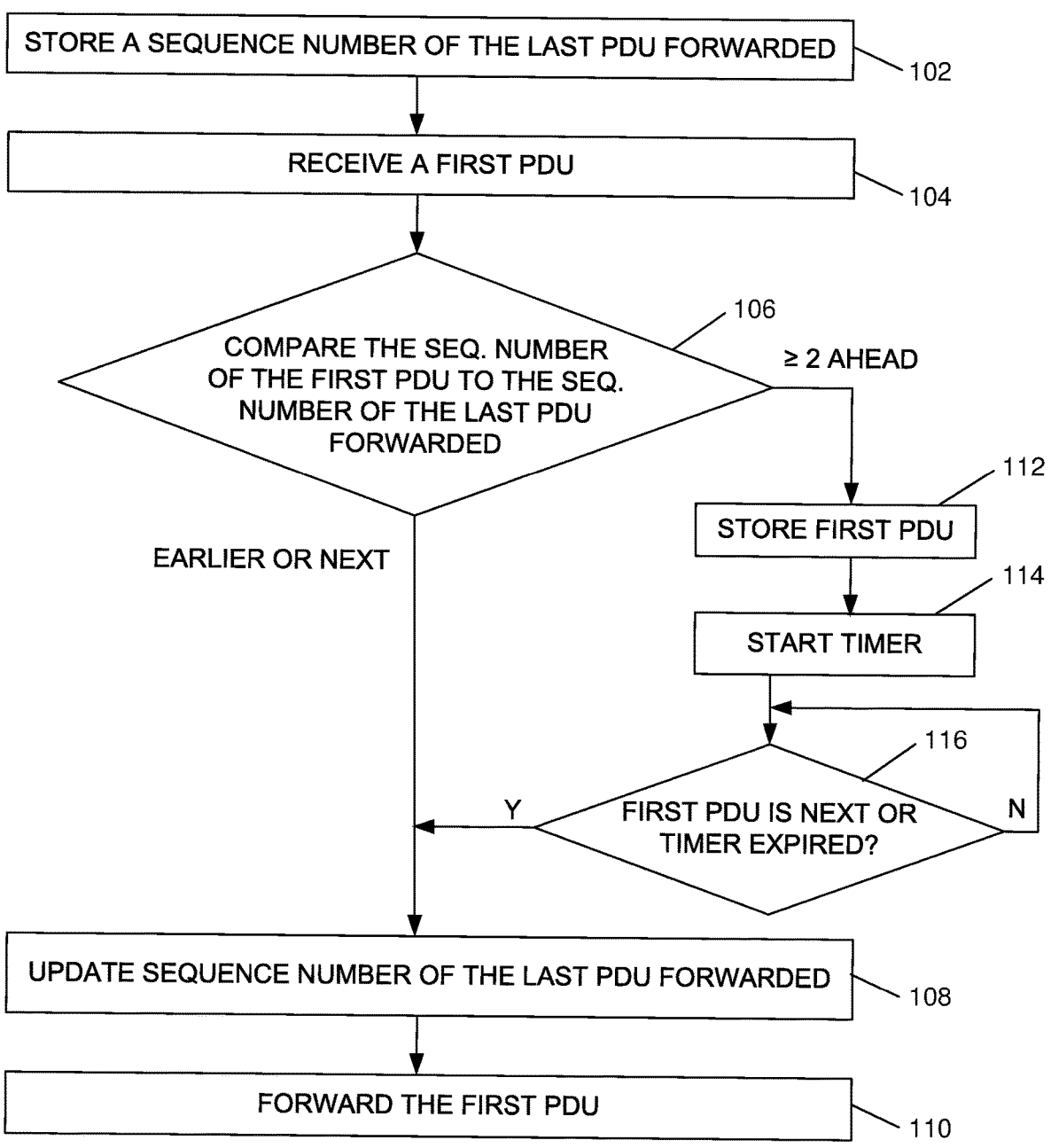
FIG. 6 is a flow diagram of receiving PDUs in a network stream of PDUs and forwarding the PDUs in a predetermined order.

FIG. 6 depicts the steps in a method 100 of receiving Protocol Data Units (PDU) in a network stream of PDUs and forwarding the PDUs in a predetermined order, wherein each PDU includes a sequence number. A sequence number of the last PDU forwarded is stored (block 102). A first PDU is received (block 104). The sequence number of the first PDU is compared to the sequence number of the last PDU forwarded (block 106). If the first PDU is earlier or next to the last PDU forwarded (that is, its sequence number is less than or equal to the sequence number of the last PDU forwarded plus one), the sequence number of the last PDU forwarded is updated to be the sequence number of the first PDU (block 108), and the first PDU is forwarded (block 110). Otherwise, if the first PDU is greater than or equal to two sequence numbers ahead of the last PDU forwarded (block 106), the first PDU is stored (block 112), and a maximum buffering time timer is started (block 114). At the first occurrence of the first PDU becoming the "next" (i.e., its sequence number is one greater than the sequence number of the last PDU forwarded) and the expiration of the maximum buffering timer (block 116), the sequence number of the last PDU forwarded is updated to be the sequence number of the first PDU (block 108), and the first PDU is forwarded (block 110).

Apparatuses described herein may perform the method 100 herein and any other processing by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 7:
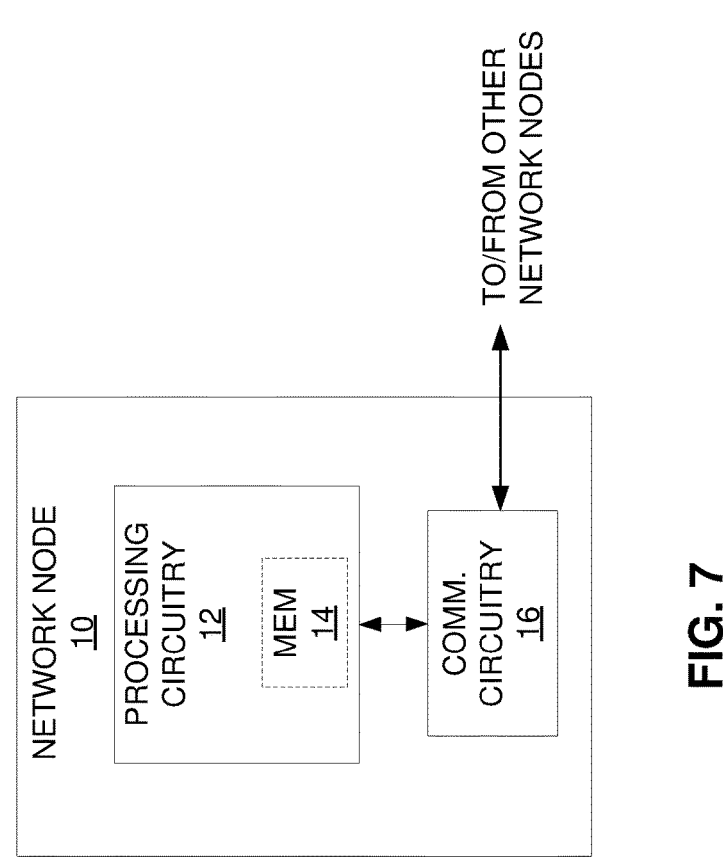
FIG. 7 is a hardware block diagram of a network node.

FIG. 7 for example illustrates a hardware block diagram of a network node 10 as implemented in accordance with one or more embodiments. As shown, the network node 10 includes processing circuitry 12 and communication circuitry 16. The communication circuitry 16 is configured to transmit and/or receive information to and/or from one or more other nodes, e.g., via any communication technology. The processing circuitry 12 is configured to perform processing described above, such as by executing instructions stored in memory 14. The processing circuitry 12 in this regard may implement certain functional means, units, or modules.

Figure 8:
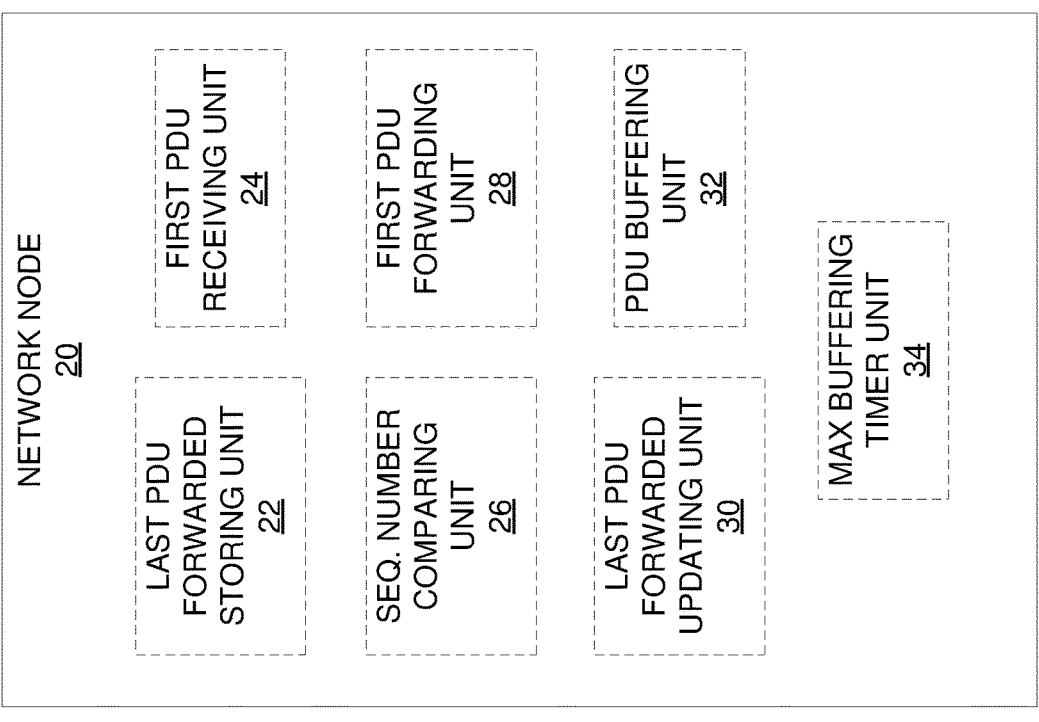
FIG. 8 is a functional block diagram of a network node implementing a PDU Ordering Function.

FIG. 8 illustrates a functional block diagram of network node 20 according to still other embodiments. As shown, the network node 20 implements various functional means, units, or modules, e.g., via the processing circuitry 12 in FIG. 7 and/or via software code. These functional means, units, or modules, e.g., for implementing the method 100 herein, include for instance: last PDU forwarded storing unit 22, first PDU receiving unit 24, sequence number comparing unit 26, first PDU forwarding unit 28, last PDU forwarded updating unit 30, PDU buffering unit 32, and maximum buffering timer unit 34.

Last PDU forwarded storing unit 22 is configured to store a sequence number of a last PDU forwarded. First PDU receiving unit 24 is configured to receive a first PDU. Sequence number comparing unit 26 is configured to compare the sequence number of the first PDU to the sequence number of the last PDU forwarded. In response to the sequence number of the first PDU being less than or equal to one greater than the sequence number of the last PDU forwarded, first PDU forwarding unit 28 is configured to forward the first PDU, and last PDU forwarded updating unit 30 is configured to update the sequence number of the last PDU forwarded to be the sequence number of the first PDU. In response to the sequence number of the first PDU being two or more greater than the sequence number of the last PDU forwarded, PDU buffering unit 32 is configured to store the first PDU and maximum buffering timer unit 34 is configured to start a predetermined maximum storage time timer. In response to the earlier of the sequence number of the first PDU being equal to one greater than the sequence number of the last PDU forwarded and the expiration of the maximum buffering timer, first PDU forwarding unit 28 is configured to forward the first PDU, and last PDU forwarded updating unit 30 is configured to update the sequence number of the last PDU forwarded to be the sequence number of the first PDU.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Embodiments of the present invention present numerous advantages over the prior art. Embodiments described herein solve the out-of-order delivery problem of Replication and Elimination functions of, e.g., TSN and DetNet networks, at OSI Layer-2 and Layer-3 levels, where no such solution currently exists. The methods described herein consider the delay bound requirements of TSN and DetNet PDU streams. The POFs described herein are simple and require in network nodes only a minimum set of states and configuration parameters (e.g., POFLastSent, POFMax Time), and consume a minimal amount of resource (e.g., time-based buffering) per PDU stream. The POFs add minimal (or no) delay to the forwarding of in-order PDUs, and do not require any synchronization between FRER nodes or functions.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein. As used herein, the term "configured to" means set up, organized, programmed, adapted, or arranged to operate in a particular way; the term is synonymous with "designed to."

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended embodiments are intended to be embraced therein. Additional information may also be found in the documents provided in the Appendix.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of receiving Protocol Data Units (PDU) in a network stream of PDUs and forwarding the PDUs in a predetermined order, wherein each PDU includes a sequence number, comprising:

storing a sequence number of a last PDU forwarded;

receiving a first PDU;

comparing a sequence number of the first PDU to the sequence number of the last PDU forwarded;

in response to the sequence number of the first PDU being two or more greater than the sequence number of the last PDU forwarded, storing the first PDU until the earlier of a predetermined buffering time expires and the sequence number of the first PDU being equal to one greater than the sequence number of the last PDU forwarded;

in response to the sequence number of the first PDU being less than or equal to one greater than the sequence number of the last PDU forwarded, forwarding the first PDU;

updating the sequence number of the last PDU forwarded to be the sequence number of the first PDU; and initializing the sequence number of the last PDU forwarded to the sequence number of a received PDU, and forwarding the received PDU, when PDU ordering is reset; and initializing the sequence number of the last PDU forwarded to the sequence number of a received PDU, and forwarding the received PDU, in response to no PDU being received for a predetermined duration.

2. The method of claim 1 wherein comparing the sequence number of the first PDU to the sequence number of the last PDU forwarded accounts for a discontinuity in PDU sequence numbers due to a circular sequence number space.

3. The method of claim 1 wherein the predetermined duration is based on one or more of a recovery timeout related setting of an upstream duplicate PDU elimination function, characteristics of the PDU stream, and the latency difference of different network paths.

4. The method of claim 1 further comprising erasing any stored PDUs upon initializing the sequence number of the last PDU forwarded.

5. The method of claim 3 wherein the characteristics of the PDU stream include inter PDU time.

6. The method of claim 1 wherein the predetermined maximum storage time is not smaller than a latency difference of the different network paths.

7. The method of claim 1 wherein ordering the PDUs in a stream further comprises identifying a network path taken by the first PDU, and wherein the predetermined maximum storage time is selected in response to the network path taken by the first PDU.

8. The method of claim 7, wherein a plurality of predetermined maximum storage times, each associated with a different network path, are stored.

9. The method of claim 7, wherein identifying the network path taken by the first PDU comprises identifying the network path using ingress interface information.

10. The method of claim 7, wherein the network path taken by the first PDU is encoded in the PDU, and wherein identifying the network path taken by the first PDU comprises reading the identification of the network path from the first PDU.

11. The method of claim 7, wherein ordering the PDUs in a stream occurs at a same node as an upstream duplicate PDU elimination function.

12. A network node implementing a Protocol Data Unit (PDU) Ordering Function (POF) operative to receive PDUs in a network stream of PDUs and forward the PDUs in a predetermined order, wherein each PDU includes a sequence number, the network node comprising:

communication circuitry configured to receive PDUs from, and transmit PDUs to, other network nodes; and processing circuitry operatively connected to the communication circuitry and configured to store a sequence number of a last PDU forwarded;

receive a first PDU;

compare a sequence number of the first PDU to the sequence number of the last PDU forwarded;

in response to the sequence number of the first PDU being two or more greater than the sequence number of the last PDU forwarded, store the first PDU until the earlier of a predetermined maximum storage time expires and the sequence number of the first PDU being equal to one greater than the sequence number of the last PDU forwarded;

in response to the sequence number of the first PDU being less than or equal to one greater than the sequence number of the last PDU forwarded, forward the first PDU;

update the sequence number of the last PDU forwarded to be the sequence number of the first PDU; and initialize the sequence number of the last PDU forwarded to the sequence number of a received PDU, and forward the received PDU, when PDU ordering is reset; and initialize the sequence number of the last PDU forwarded to the sequence number of a received PDU, and forward the received PDU, in response to no PDU being received for a predetermined duration.

13. The network node of claim 12 wherein the processing circuitry is configured to compare the sequence number of the first PDU to the sequence number of the last PDU forwarded by accounting for a discontinuity in PDU sequence numbers due to a circular sequence number space.

14. The network node of claim 12 wherein the processing circuitry is further configured to erase any stored PDUs upon initializing the sequence number of the last PDU forwarded.

15. The network node of claim 12 wherein the predetermined duration is based on one or more of a recovery timeout related setting of an upstream duplicate PDU elimination function, characteristics of the PDU stream, and the latency difference of different network paths.

16. The network node of claim 12 wherein the predetermined maximum storage time is not smaller than a latency difference of the different network paths.

17. The network node of claim 12 wherein the processing circuitry is further configured to identify a network path taken by the first PDU, and wherein the predetermined maximum storage time is selected in response to the network path taken by the first PDU.

18. The network node of claim 17 wherein the processing circuitry is further configured to store a plurality of predetermined maximum storage times, each associated with a different network path.

19. The network node of claim 17 wherein identifying the network path taken by the first PDU comprises identifying the network path using ingress interface information.

20. The network node of claim 17 wherein the first node is further configured to forward the PDUs via different network paths, each having a different latency, to a second, downstream node by encoding an identification of the network path into each PDU prior to forwarding it, and wherein the processing circuitry is configured to identify the network path taken by the first PDU by reading the identification of the network path from the first PDU.

* * * * *